United States Patent [19]

Tobe

[11] Patent Number: 5,134,500

[45] Date of Patent: Jul. 28, 1992

[54] VIDEO DISK PLAYER WITH DISK CODE DEMODULATION USING REPRODUCED SYNC SIGNAL

[75] Inventor: Takeo Tobe, Tokorozawa, Japan

[73] Assignee: Pioneer Electronic Corporation, Tokyo, Japan

[21] Appl. No.: 473,660

[22] Filed: Feb. 1, 1990

[30] Foreign Application Priority Data

Apr. 3, 1989 [JP] Japan .................................. 1-84255

[51] Int. Cl.⁵ .............................................. H04N 5/92
[52] U.S. Cl. .................................. 358/342; 369/48; 369/50
[58] Field of Search .................. 369/32, 47–50, 369/54; 360/27, 32, 51; 358/335, 342, 907

[56] References Cited

U.S. PATENT DOCUMENTS

| | | | |
|---|---|---|---|
| 4,697,176 | 9/1987 | Kawakami | 369/48 X |
| 4,796,247 | 1/1989 | Vogelsang | 358/907 X |
| 4,931,877 | 6/1990 | Gebhardt et al. | 358/335 |
| 4,937,804 | 6/1990 | Ishihara | 369/48 |
| 4,953,035 | 8/1990 | Yoshio | 358/335 |
| 4,959,825 | 9/1990 | Okano | 369/48 |
| 5,010,417 | 4/1991 | Yoshio et al. | 358/335 |
| 5,063,551 | 11/1991 | Yoshio et al. | 369/48 |

Primary Examiner—Roy N. Envall, Jr.
Assistant Examiner—W. R. Young
Attorney, Agent, or Firm—Wegner, Cantor, Mueller & Player

[57] ABSTRACT

A disk player is provided in which clock pulses of a frequency corresponding to the frequency of a synchronizing signal separated from a video signal obtained from the disk is generated and a disk code separated from the video signal is demodulated by the clock pulses, which makes it possible to perform a search operation in a short time.

1 Claim, 3 Drawing Sheets

VIDEO DISK PLAYER WITH DISK CODE DEMODULATION USING REPRODUCED SYNC SIGNAL

BACKGROUND OF THE INVENTION

1. Field of the Invention

The present invention relates to a disk player which plays a recorded disk such as a video disk on which a composite video signal (hereinafter simply referred to as video signals) is recorded.

2. Description of the Related Art

A conventional disk player is shown in FIG. 1. In the Figure, disk 1 is rotationally driven by a spindle motor 2. On the disk 1 a video signal is recorded in which a pulse train signal is inserted in a portion corresponding to a predetermined horizontal period in a vertical blanking period. The pulse train signal is obtained by modulating a disk code comprising a time code and a frame number which expresses a position of an information signal recorded on a disk 1. The modulation method, for example, a biphase mark modulation method in which the instantaneous level of the pulse train signal is adjusted to be between the white level and the pedestal level of the video signal.

The information signal recorded on the video disk 1 is read by a pickup 3 with the revolutions of the disk 1. The pickup 3 is held with a slider (not shown in the drawing) which is moved in the radial direction of a turn table by a slider motor 4, and an information detection point (a reading light spot in the case of an optical system) of the pickup 3 can be freely positioned in the radial direction of the disk 1. There are provided a spindle servo system, a tangential servo system, a tracking servo system, a slider servo system, etc., but they are not shown in the drawings because they are well known in the art.

The spindle motor 2 and the slider motor 4 are driven by the spindle servo system, the slider servo system or a play section control circuit 5. The play section control circuit 5 executes the driving of the spindle motor 2 and the slider motor 4, the ON-OFF control for the servo systems described in the above, which are not shown in the drawings, and a jump operation control, etc. in response to commands from the system controller 7.

A so called RF signal output from the pickup 3 is supplied through an RF amplifier 8 to a demodulation circuit 9 which is constituted with an FM demodulator, etc. and produces the video signal. The video signal is supplied to a signal-separation circuit 10 and a video output terminal OUT. The signal separation circuit 10 is constituted to extract a horizontal synchronizing signal h and a vertical synchronizing signal v from a signal obtained by slicing the video signal, for example, at a first fixed level between a pedestal level and a synch-tip level, and to produce a pulse train signal c obtained by slicing the video signal at a second fixed level between a white level and the pedestal level.

The horizontal synchronizing signal h, the vertical synchronizing signal v and the pulse train signal c are supplied to a decoder 11. For example, clock pulses check ck1 of 3 MHz for the demodulation process of the pulse train signal c are supplied to the decodor 11 from a pulse generation circuit 12 comprising a crystal oscillator etc. The decoder 11 is constituted to detect a portion corresponding to a disk code in the pulse train signal c by a horizontal synchronizing signal h and a vertical synchronizing signal v, and successively holds instantaneous levels at the time of generation of the clock pulses ck1 in the portion corresponding to the disk code as bit values of individual bits of the disk code modulated with the biphase mark modulation method, and a disk code is obtained by a decoding process of an obtained bit train.

The disk code demodulated by the decoder 11 is supplied to the system controller 7. The system controller 7 is constituted with a microcomputer comprising, for example, a processor, a ROM, a RAM, etc., and it performs computing operation based on the data and the program stored in the RAM or the ROM following a command corresponding to the key operation supplied from a control section 13, and after that it sends out a command signal such as a play command, a jump command, etc. to the play section control circuit 5.

In the above arrangement, the time duration of a portion corresponding to a bit of a disk code modulated by the biphase mark modulation method in the pulse train signal c supplied to the decoder 11 varies in correspondence to the number of revolution of the disk 1, but the frequency of the clock pulses ck1 is fixed. Therefore, in the decoder 11 unless the number of revolution of the disk 1 becomes close to the rated number of revolutions, the bit value of each bit of the disk code modulated with the biphase mark modulation method is not maintained at a correct value, and the disk code is not demodulated accurately. When, therefore, a search operation is performed, the operation of a processor in the system controller 7 is as follows: at first the processor calculates the number of tracks between the position of the information detection point and the designated position (step S1); and the processor moves the information detection point of the pickup 3 by the number of tracks obtained in the step S1 in driving the slider motor 4, as seen from FIG. 3. After that, the processor repeats the judgements if the number of revolution of the disk 1 is close to the rated number of revolutions (step S3), and only when the number of revolution of the disk 1 is judged to be close to the rated number of revolutions, it takes in the output data of the decoder 11 (step S4) and judges if the position of the information detection point of the pickup 3 coincides with the designated position (step S5). In the step S5, when the position of the information detection point of the pickup 3 is judged to coincide with the designated position, the processor resumes the execution of a routine work being executed just before it moves to the step S1. When the position of the information detection point of the pickup 3 is judged not to coincide with the designated position, the processor performs return to step S1.

As mentioned in the above in the conventional device, after a track-jump the number of revolutions of the disk 1 has to be detected by the process shown in step S3 if it is close to the rated number of revolutions and if it is the output data of the decoder 11 is taken in for judging if the position of the information detection point of the pickup 3 is reached at a designated position. Therefore, in a conventional device, especially in the case of a CLV (constant line speed) disk player in which the rated number of revolutions differs with the position of the information detection point of the pickup 3, a long time is needed after a track-jump till the number of revolutions of the disk 1 reaches at a value close to the rated number of revolutions. It is a drawback to a conventional device that a long time is needed for the completion of a search operation.

SUMMARY OF THE INVENTION

An object of the present invention is to provide a disk player in which a search operation can be performed in a short time.

In a disk player according to the present invention, a clock pulse generation means is provided for generating clock pulses of a frequency corresponding to the frequency of a synchronizing signal separated from the video signal obtained from the disk, and a disk code separated from the video signal obtained from the disk is demodulated by the output of the clock pulse generation means.

DETAILED DESCRIPTION OF PREFERRED EMBODIMENTS

The embodiment of the invention will be explained referring to FIG. 2 in the following.

Figure 1:
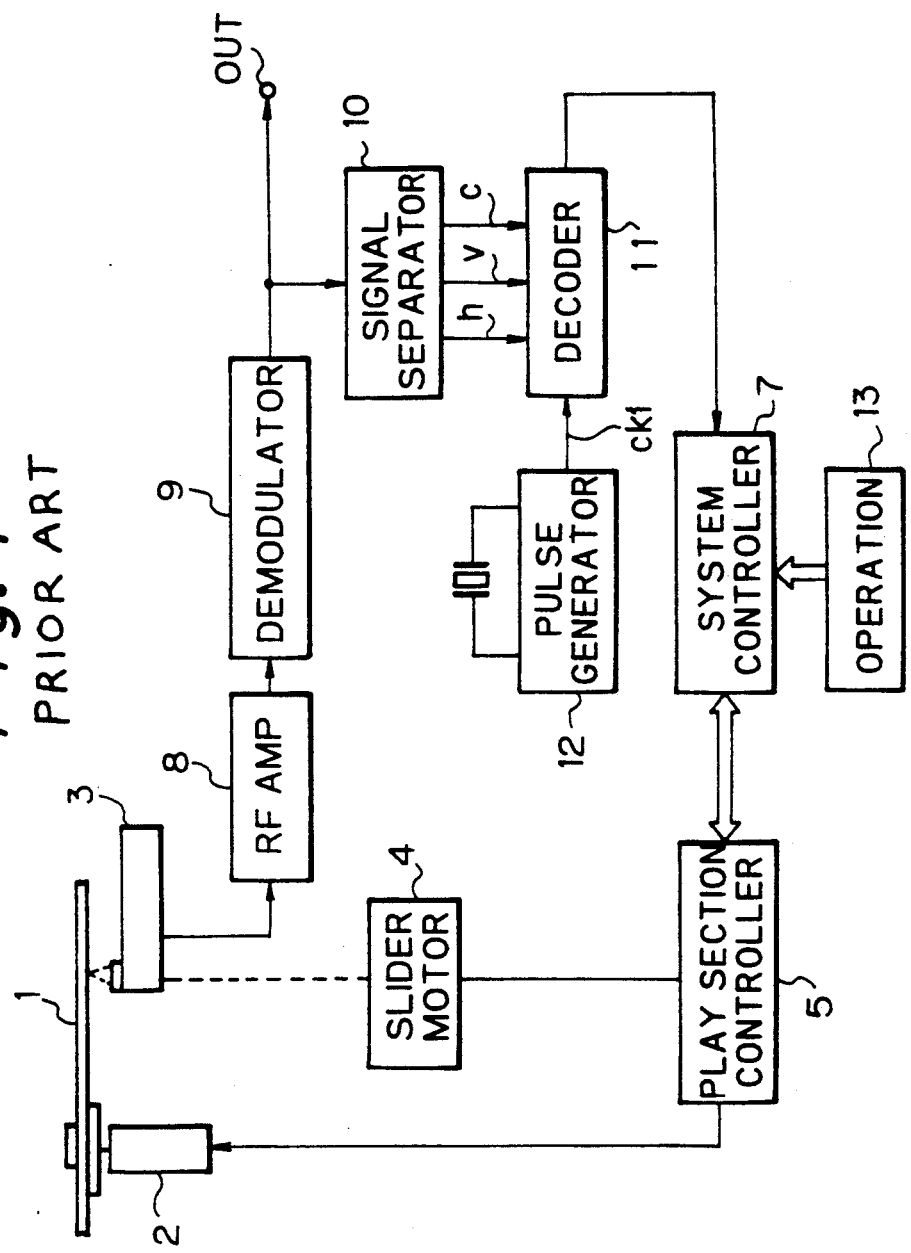
FIG. 1 is a block diagram showing a conventional disk player.
Figure 2:
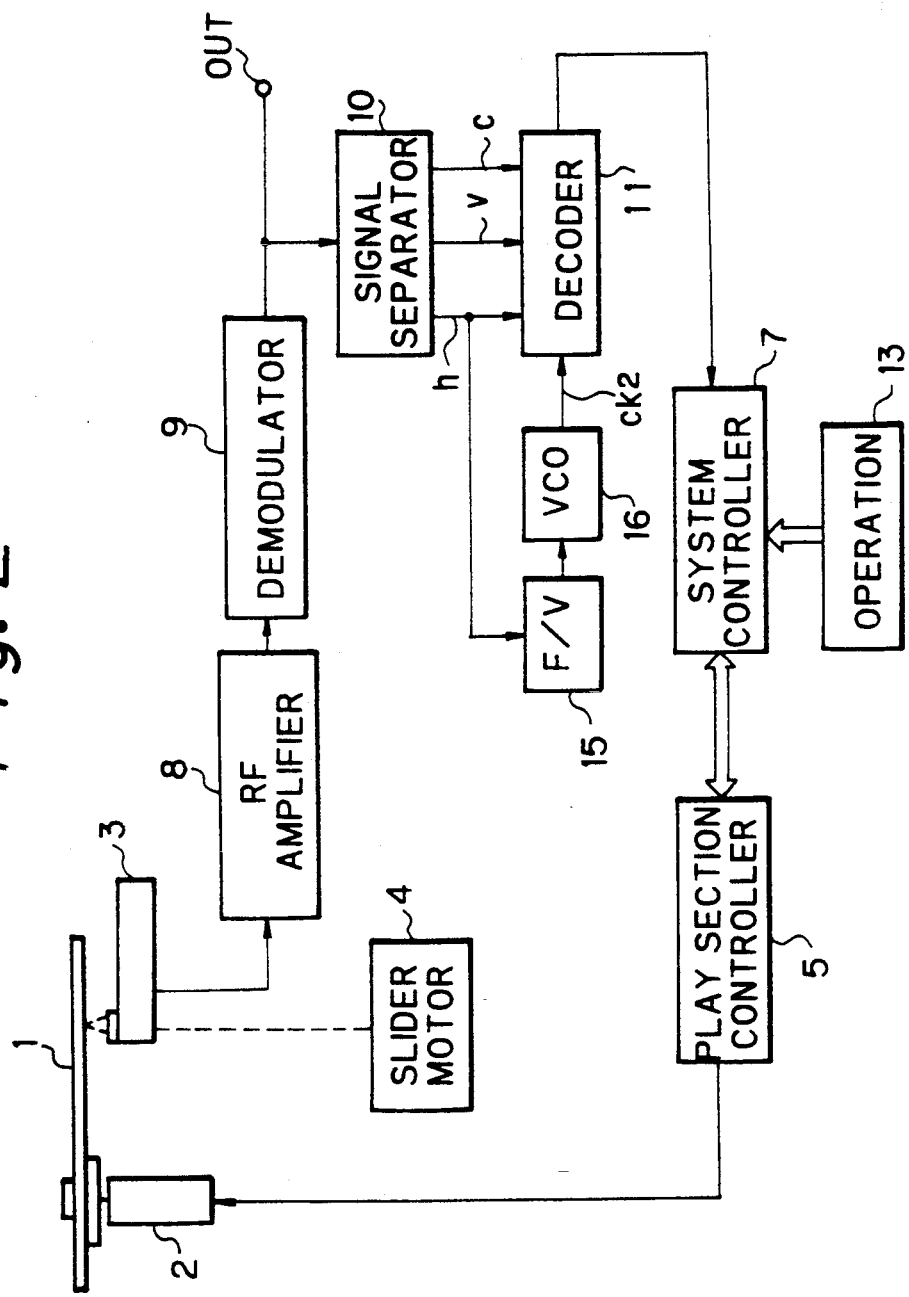
FIG. 2 is a block diagram showing a disk player according to the present invention.
Figure 3:
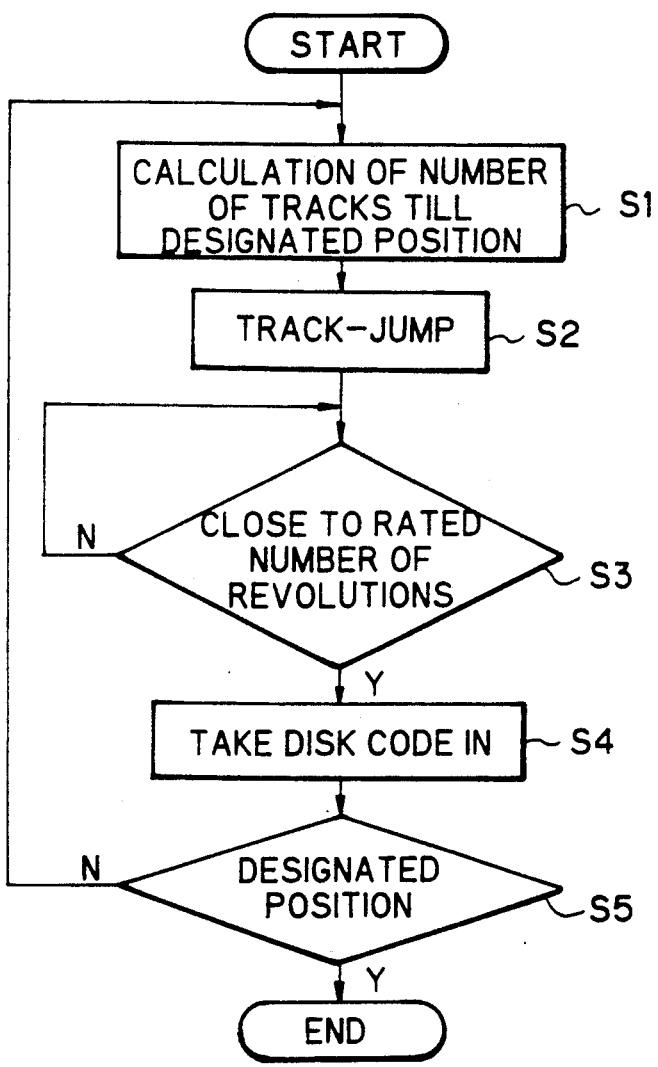
FIG. 3 is a flow chart showing the operation of a processor in the system controller of the disk player of FIG. 1.

In FIG. 2, the disk 1, the spindle motor 2, the pickup 3, the slider motor 4, the play section control circuit 5, the system controller 7, the RF amplifier 8, the demodulation circuit 9, the signal separation circuit 10, and the decoder 11 are connected in a similar way to those shown in FIG. 1. In the present embodiment however, a horizontal synchronizing signal h separated and extracted by the signal separation circuit 10 is supplied to the decoder 11 and also simultaneously supplied to an F/V conversion circuit 15. The F/V conversion circuit 15 is constituted, for example, with an integration circuit, so as to generated a voltage corresponding to the frequency of the horizontal synchronizing signal h. The output of the F/V conversion circuit 15 is supplied to a VCO (voltage controlled type oscillator) 16. Therefore, clock pulses ck2 of a frequency corresponding to the frequency of the horizontal synchronizing signal h is produced from the VCO 16. The output pulses of the VCO 16 are supplied to the decoder 11 as the clock pulses for a demodulation process.

In the above constitution, the frequency of the horizontal synchronizing signal h corresponds to the number of revolutions of the disk 1, so that the frequency of the clock pulses ck2 also corresponds to the number of the revolution of the disk 1. The clock pulses ck2 are supplied to the decoder 11, so that even though the time duration corresponding to a bit of the disk code modulated with the biphase mark modulation method to be supplied to the decoder 11 is changed in correspondence to the number of revolutions of the disk 1, the bit value of each bit of the disk code modulated in the decoder 11 is correctly maintained and the disk code is accurately demodulated.

Therefore, in a search operation the processor is able to take in the output of the decoder 11 immediately after a track-jump even when the number of revolution of the disk 1 is not close to the rated number of revolutions and to judge if the information detection point of the pickup 3 is reached at a designated position. Owing to this arrangement, the time for a search operation can be shortened. When a play is to be started without the movement of the pickup 3 to a fixed position such as an innermost track, the position of the information detection point of the pickup 3 can be detected immediately after the start of revolution of the disk 1, so that a command to drive the spindle motor 2 at the number of revolutions corresponding to the position of the information detection point of the pickup 3 can be sent out to the play section control circuit 5 immediately after the start of revolution of the disk 1, which makes the spindle servo system build up in a short time. A search operation can be performed immediately after the start of revolution of the disk 1.

In the above embodiment, the horizontal synchronizing signal h is supplied to the F/V conversion circuit 15 for generating a control voltage for the VCO 16, but in another method, a number of revolutions detection means is provided which generates the pulses of a frequency corresponding to the number of revolutions of the spindle motor 2, and the control voltage for the VCO 16 can be generated by supplying the output pulses of the number of revolutions detection means to the F/V conversion circuit 15.

As described in detail in the above, in a disk player according to the present invention a clock pulse generation means is provided which generates clock pulses of a frequency corresponding to the frequency of a synchronizing signal separated from a video signal obtained from the disk, and a disk code separated from the video signal obtained from the disk is demodulated by the output of the clock pulse generation means. Therefore, in a disk player according to the present invention, even if the time duration of a portion corresponding to a bit of the disk code separated from the video signal obtained from the disk varies in correspondence to the number of revolutions of the disk, the output frequency of the clock pulse generation means is also changed in correspondence with the number of revolutions of the disk, so that after a track-jump in a search operation even when the number of revolutions of the disk is not close to the rated number of revolutions, the processor immediately reads the disk code correctly and can judge if the information detection point of the pickup 3 reaches at a designated position, which makes it possible to perform a search operation in a short time.

What is claimed is:

1. A disk player for playing a disk carrying thereon an information signal including a composite video signal having at a preselected section thereof a disk code modulated by a modulation method comprising: a play means for playing said disk so as to read said information signal from said disk; a separation means for separating a synchronizing signal and a disk code from the composite video signal contained in said information signal; a clock pulse generation means for generating clock pulses of a frequency corresponding to the frequency of the synchronizing signal separated by said separation means; a demodulation means for demodulating the disk code separated by said separation means by using said clock pulses; and a controller for controlling said play means on the basis of the output of said demodulation means.

* * * * *